(12) United States Patent
Piccionelli

(10) Patent No.: US 10,664,549 B2
(45) Date of Patent: May 26, 2020

(54) AGGREGATION OF LIVE PERFORMANCES ON AN AGGREGATE SITE ON A NETWORK

(71) Applicant: Gregory A. Piccionelli, Westlake Village, CA (US)

(72) Inventor: Gregory A. Piccionelli, Westlake Village, CA (US)

(*) Notice: Subject to any disclaimer, the term of this patent is extended or adjusted under 35 U.S.C. 154(b) by 0 days.

(21) Appl. No.: 16/377,937

(22) Filed: Apr. 8, 2019

(65) Prior Publication Data

US 2019/0236104 A1 Aug. 1, 2019

Related U.S. Application Data

(63) Continuation of application No. 13/385,847, filed on Mar. 9, 2012, now Pat. No. 10,255,374.

(60) Provisional application No. 61/464,936, filed on Mar. 11, 2011.

(51) Int. Cl.
| | |
|---|---|
| *G06F 16/957* | (2019.01) |
| *G06Q 10/06* | (2012.01) |
| *H04L 29/08* | (2006.01) |
| *H04L 29/06* | (2006.01) |

(52) U.S. Cl.
CPC ....... *G06F 16/957* (2019.01); *G06Q 10/0639* (2013.01); *H04L 65/40* (2013.01); *H04L 67/02* (2013.01)

(58) Field of Classification Search
CPC ........ H04L 29/06; H04L 29/06387–29/06462; H04L 67/00–67/08; H04L 65/1066–65/1083; H04L 65/40–65/608; G06F 16/95–16/957; G06Q 10/06–10/0639
See application file for complete search history.

(56) References Cited

U.S. PATENT DOCUMENTS

| | | | | |
|---|---|---|---|---|
| 7,979,877 | B2* | 7/2011 | Huber | G06Q 30/02 725/32 |
| 2003/0126267 | A1* | 7/2003 | Gutta | G06F 21/6209 709/229 |
| 2008/0086747 | A1* | 4/2008 | Rasanen | H04N 21/4828 725/46 |
| 2010/0026802 | A1* | 2/2010 | Titus | G08B 13/19608 348/143 |

* cited by examiner

*Primary Examiner* — Clayton R Williams
(74) *Attorney, Agent, or Firm* — Gregory B. Gulliver

(57) ABSTRACT

A method of aggregating displays of performances into an aggregate site on a network is provided. The aggregated performances originate from at least one performance site on a network. The method includes the steps of selecting a performance criterion; observing at least one performance originating from at least one performance site on a network, the performance being associated with a link; determining when at least one performance meets the performance criterion; establishing an aggregation link to the link associated with the performance meeting the performance criterion; and providing the aggregation link to an aggregate site on a network such that the performance is accessible on the aggregate site.

18 Claims, 2 Drawing Sheets

AGGREGATION OF LIVE PERFORMANCES ON AN AGGREGATE SITE ON A NETWORK

This application is based on U.S. Provisional Patent Application Ser. No. 61/464,936, filed Mar. 11, 2011, the entire disclosure of which is incorporated herein by reference.

FIELD OF THE INVENTION

The present invention relates to methods for displaying live performances on a site on a network, and more particularly, live performances satisfying one or more performance criteria.

BACKGROUND OF THE INVENTION

Live performances are commonly displayed on sites on networks such as the Internet. In particular, sites which enable selecting and viewing individual performers from a menu featuring a plurality of performers are known. On such sites, for example MyFreeCams.com®, typically a plurality of thumbnails or other displays are offered, each featuring a link to a live performance by an individual performer or group of two or more performers. A viewer of the site typically selects a performer by clicking on or otherwise selecting the performer's image, at which point a window is opened on which the viewer is enabled to view a live display of the selected performer. The selected performer, depending on factors such as viewer requests, viewer payments, individual desire to perform, etc., may engage at a given time in a performance, such as a dance, striptease, nude or semi-nude modeling or video chat. Such a performance can commence subsequent to the viewer's selection of the performer's image or other display, or can be in progress at the time the viewer makes his selection.

At specific points during the performance, the performer may perform one or more desired acts. For example, at a certain time the performer may remove one or more articles of clothing, such that the performer reveals sufficient portions of her anatomy to be considered topless or nude.

Particular viewers may desire to view only those performers who presently meet one or more performance criteria, such as performing while topless or nude.

A need exists for a method that enables a viewer of a site on a network, such as the Internet, to select and view only performances that meet one or more desired performance criteria, without having to view non-compliant performances.

A need also exists for a method for marketing a performer whose performance meets one or more performance criteria.

SUMMARY OF THE PREFERRED EMBODIMENTS

In accordance with one aspect of the present invention, there is provided a method of aggregating access to displays of performances into an aggregate site on a network, the performances originating from at least one performance site on a network. The method includes the steps of: selecting one or more performance criteria; observing at least one performance originating from at least one performance site on a network, the performance being associated with a link; determining when at least one performance meets the performance criterion or criteria; establishing an aggregation link to the link associated with the performance meeting the performance criterion or criteria; and providing the aggregation link to an aggregate site on a network such that the performance is accessible on or via the aggregate site.

Access to the performance on the aggregate site can, in various particular embodiments, be indirect or direct. Thus, the aggregate site can provide indirect access, via thumbnail photos of the performers, or numbers, symbols, or other abstract indicia of the performers; or direct access, via mini-views of the actual performances in progress. Indirect access can be obtained by activating a thumbnail or other abstract indicium (such as via a mouse- or touchpad-click). In some embodiments, access to the live performance meeting the one or more performance criteria may be effectuated from the aggregate site through a plurality of links which must be sequentially engaged (such as, for example, a link from the aggregate site to a thumbnail link displayed on a website, which when engaged then provides access to a live performance complying with the one or more selected performance criteria). Direct access can be further modified by, e.g., clicking on a "mini-view" thumbnail of live performance in order to access an enlarged or full-screen view of the performance.

Performances can be aggregated from a variety of performance sites, in various particular embodiments of the inventive method. According to some embodiments, links are established in the aggregate site to specific performances meeting the performance criteria (or display links thereto) displayed on one or more sites that afford access to a plurality of performances, such as MyFreeCams.com® (www.myfreecams.com), Live Jasmine® (www.livejasmine.com), etc. According to other embodiments, links are established to performances displayed on sites maintained, operated or utilized by individual live cam performers which feature a single live cam performer. According to still other embodiments, links to combinations of two or more of the foregoing types of sites are established.

In some preferred embodiments the aggregated links to performances (e.g., thumbnail links or other indicia links to performances, or "mini views" displaying the live performance in progress) displayed on the aggregation site can be made to appear in a "tube-site" fashion (such as that displayed at www.porntube.com or www.tube8.com) whereby a user is provided with a plurality of selectable mini-view displays of performances in progress or other indicia links to performances of performers who meet the criteria such as being nude or semi-nude at the time of the presentation of the selectable displayed performances or other indicia links to performances. Such dynamic aggregated presentation of accessibility to such performances thereby provides to a user a fast and efficient means of finding and accessing performances that meet a particular criteria or plurality of criteria, such as performers that are performing "nude now" without the need to manually click on a large number of thumbnail links to performances that may or may not meet the performance criterion or criteria (such as is presently the case regarding websites such as MyFreeCams.com®). In some further embodiments, where the dynamic aggregated presentation of accessibility to such performances includes the aggregation of accessibility to performances meeting a criterion or plurality or criteria to or through a plurality of websites that present an aggregation of selectable accessibility to performances (such as a plurality of "live-cam" websites such MyFreeCams.com®, Live Jasmine®, etc.), individual sites (such as individual performer "live-cam" sites), or a combination thereof, which may or may not meet the criteria, the present invention provides the user with a means of more quickly locating and accessing performances that meet the criterion or plurality of criteria.

Observation or evaluation of the performances to determine if the performances meet the criterion or plurality of criteria according to specific embodiments of the foregoing method are carried out by one or more human observers, who access performance sites via a network, view one or more performances, and determine when selected performance criterion or criteria are met. According to alternative embodiments, some or all of the observation or evaluation functions to determine if the performances meet the performance criterion or plurality of performance criteria are automatically carried out by one or more bots or one or more other automated means. According to alternative embodiments, some or all of the observation functions to determine if the performances meet the criterion or plurality of criteria are carried out in part by one or more humans and in part by one or more bots or one or more other automated means.

Alternative methods according to the present invention afford direct linkage from a performer's performance site to an aggregate site. Thus, in accordance with another aspect of the present invention, there is provided a method of aggregating displays of performances into an aggregate site on a network, the performances originating from at least one performance site on a network. The method includes the steps of: selecting a performance criterion; providing at least one performance originating from at least one performance site on a network, the performance being associated with a link; establishing an aggregation link to the link associated with the performance when a performer in the performance determines that the performance meets or will meet the performance criterion; and providing the aggregation link to an aggregate site on a network such that the performance is accessible on the aggregate site. In more specific embodiments, the performer determines that the performance meets, or will at a time in the future meet within a specified time interval, the performance criterion or criteria. It is to be understood that one or more of the steps above may be performed by one or more humans, one or more automated means or a combination thereof.

Other features and advantages of the present invention will become apparent to those skilled in the art from the preceding and the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1A illustrates an initial state of a display at time T1 in which thumbnails, numbers, symbols or other abstract indicia associated with various performers are presented for determination of compliance with a performance criterion. FIG. 1B illustrates a subsequent state at time T2 in which compliant performances are identified. FIG. 1C illustrates the aggregation of compliant performances into the aggregate site, where each complaint performance is made available for viewing by a user over a network.

Like numerals refer to like parts throughout the several views of the drawings.

DETAILED DESCRIPTION OF THE PREFERRED EMBODIMENTS

As employed herein, the term "aggregate site" denotes a site on a network at which a plurality of displays are provided, with the displays being directed to the aggregate site from one or more sites on which performances are initially displayed, or are made available by link (e.g., via activation of a thumbnail, number, symbol or other abstract indicium associated with a performer). In some preferred embodiments, such displays are associated with or contain links to the performances that meet the performance criterion or criteria, such that engagement of the link by clicking on the display will cause a user's web browser to connect with the performance that complies with the performance criterion or criteria or a link to the performance that meets the performance criterion or criteria. In some embodiments, the display of thumbnail displays of live performances meeting one or more criteria, or iconic links to such performances, or iconic links to links to such performances can be aggregated to appear a grid-like display similar to "tube sites" that display thumbnail display links to recorded content.

Figure 1A:
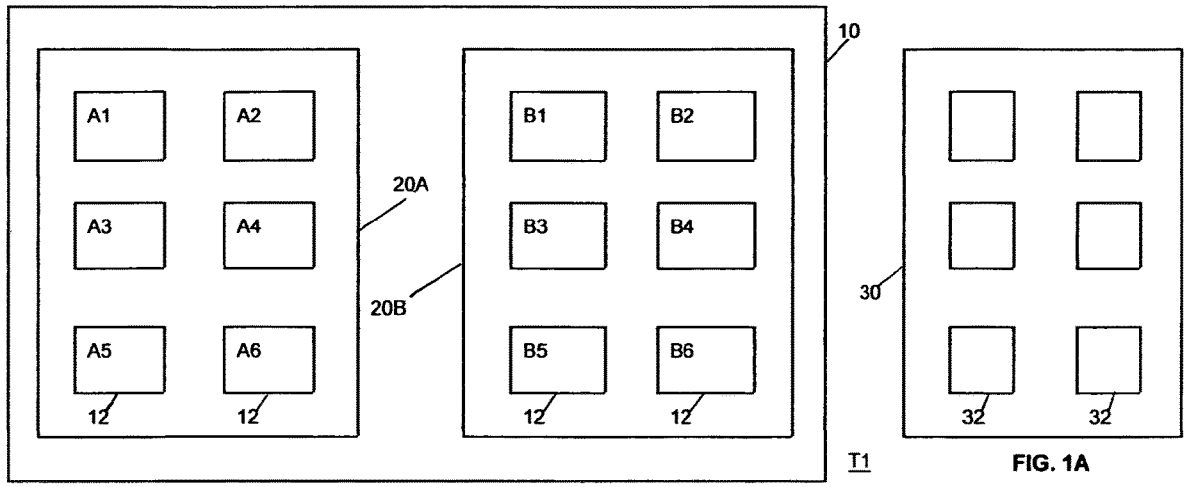
FIGS. 1A-C are illustrations of a monitoring site that monitors one or more sites (as shown, two sites) that feature live performances by human performers, and an aggregate site that displays only such performances as satisfy a performance criterion.
Figure 1B:
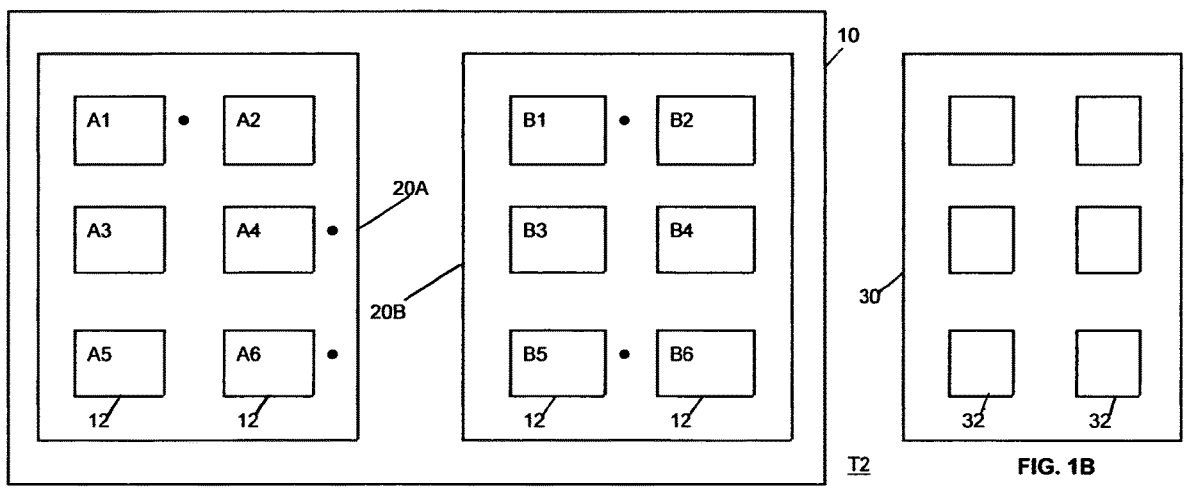
Figure 1C:
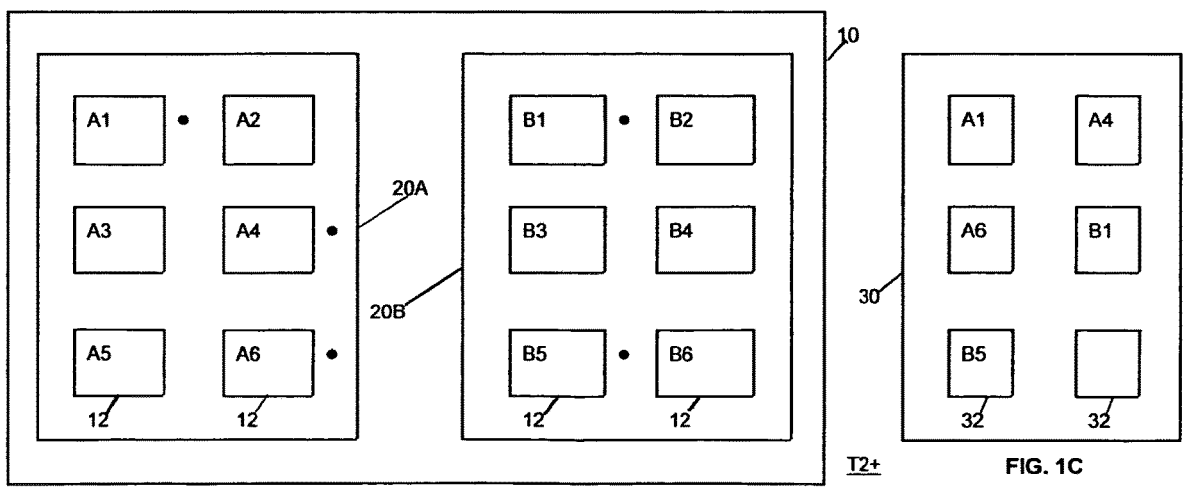

Referring to FIGS. 1A-C, display 10 provides access to one or more performance sites offering multiple windows 12 each featuring a thumbnail, number, symbol or other abstract indicium associated with a performer. As shown, performance sites 20A and 208 offer multiple windows featuring such indicia associated with performers A1-A6, B1-B6. At time T1, aggregate site 30 initially displays a plurality of blank windows 32 (see FIG. 1A).

A human observer of display 10 selects one or more individual performers for viewing, and activates the thumbnail or other indicium associated with the selected performer(s) in order to view their performances. As illustrated, the human observer observes at time T2 that performers A1, A4, A6, B1 and B5 now meet a performance criterion. In particular embodiments, the performers are human females who have removed clothing sufficient to be considered topless, or nude, and thus to comply with the performance criterion of being topless or nude. In FIG. 1B, the human observer selects windows 12 displaying performers A1, A4, A6, B1 and B5 engaged in performances compliant with the performance criterion (indicated by dots adjacent each selected window in the exemplary illustration of FIG. 1B, although such displays are optional). The human observer then establishes an aggregation link from the link associated with performances A1, A4, A6, B1 and B5, and provides the aggregation links so established to aggregate site 30, such that each selected performer is displayed at time T2+ in an open window 32 of aggregate site 30 (FIG. 1C).

Aggregate site 30 is made available to one or more human viewers over a network, such as the Internet or any other wide-area or local network. Thus, a human viewer of aggregate site 30 is enabled to view only the desired compliant performances, i.e., the performances that meet the performance criterion, without having to search through non-compliant performances before locating a compliant performance. In the foregoing particular embodiments, the human viewer is thus enabled to view only those performers who are presently topless or nude.

Figure 2A:
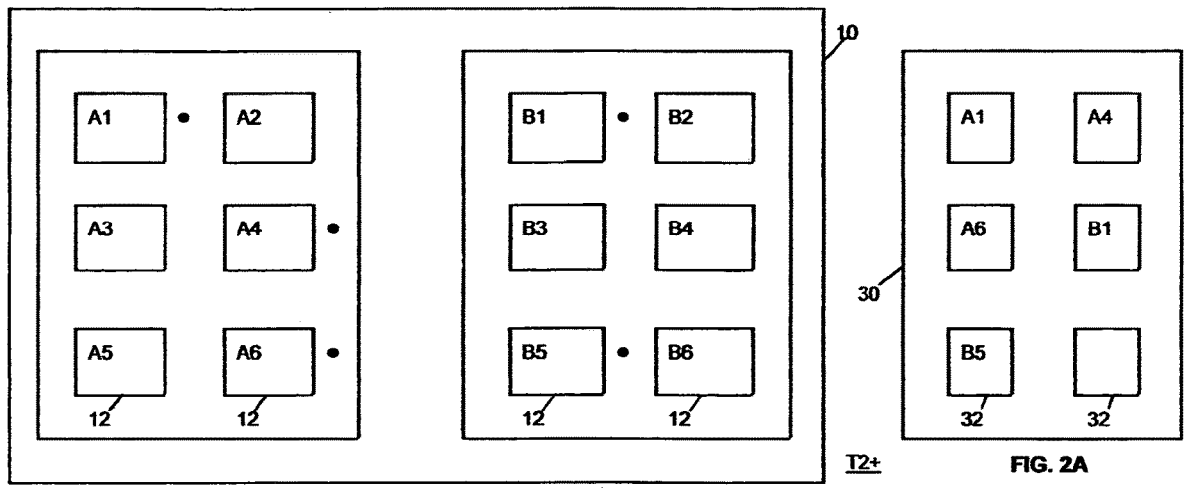
FIGS. 2A-C are illustrations of a subsequent selection procedure in which one or more performances compliant at time T2 (FIG. 2A) become non-compliant at time T3, while other previously non-compliant performances become compliant (FIG. 2B). Non-compliant performances are then removed from the aggregate site, while the newly-compliant performances are added to the aggregate site (FIG. 2C).
Figure 2B:
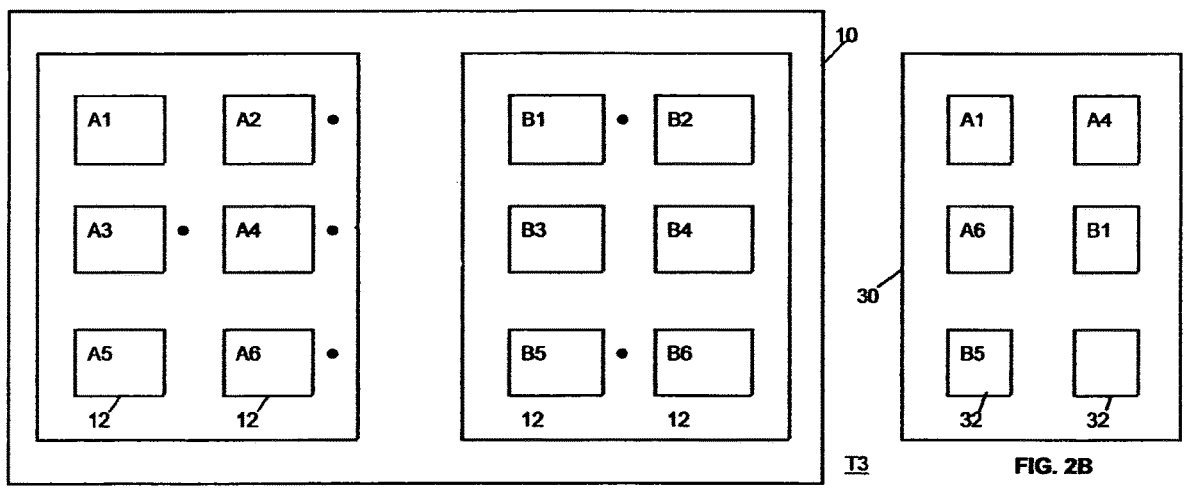
Figure 2C:
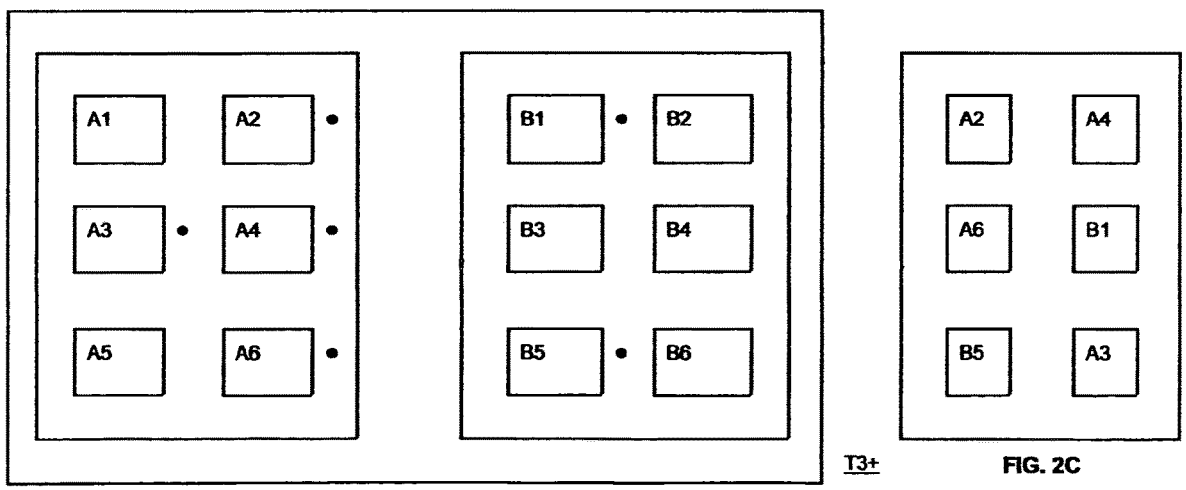

According to particular embodiments, aggregate site 30 is monitored, randomly, periodically or continually, in order to ensure that performance provided on aggregate site 30 meet the site's performance criterion (or criteria). Referring to FIGS. 2A-C, performers A1, A4, A6, B1 and B5 from performance sites 20A, 20B, respectively, are displayed on aggregate site 30 at time T2+ (FIG. 2A). At time T3, a human observer (who can be, in various embodiments, the same observer who initially established aggregation links to the various compliant performances, or a different observer) observes that performer A1 now does not meet the aforementioned performance criterion, while performers A2 and A3 now meet the performance criterion. Thus, performers A2, A3, A4, A6, B1 and B5 meet the performance criterion at time T3. The human observer thus deletes the aggregation link to performer A1 from the window 32 in aggregate site 30, and replaces that aggregation link with an aggregation link to performer A2. The human observer also establishes an aggregation link to performer A3 and provides the aggregation link to open window 32 in aggregate site 30 to provide an up-dated display on aggregate site 30 at time T3+ (FIG. 2C). At subsequent times, as performers cease to meet the performance criterion, displays of their performances are removed from aggregate site 30; likewise, as new performers meet the performance criterion, displays of their performances are added to aggregate site 30 as window space permits.

Alternative procedures for ensuring the removal of performances that no longer comply with selected performance criteria are provided in further particular embodiments. According to certain embodiments, aggregation links are periodically or randomly disconnected. For example, in very specific embodiments, some or all aggregation links are subject to "automatic time-out" after a pre-determined time interval, such as 15 or 30 minutes, or alternatively, after a randomly determined time (which may include a minimum time, such as 10 minutes, and a randomly-determined additional time). According to certain other embodiments, disconnection takes place when a previous video display is replaced (e.g., by a performer herself) with a display recognized as no longer meeting the performance criterion. Such displays include, for example, messages indicating that the performance is no longer accessible to viewers generally, such as "I'm in a private show now". In some further embodiments, the data comprising a display such as one indicating "I'm in a private show now" is recognized by automated means. In still further embodiments the disconnection of the links and/or termination of the display on the aggregation site is effectuated by automated means. According to further embodiments, disconnection takes place when the displayed performance includes insufficient indications of compliance with performance criteria. For example, the displayed performance may no longer exhibit a sufficient display of skin tone to ensure that the performer is topless or nude. Such insufficiency can be recognized, in some specific embodiments, by a human observer as mentioned above, or alternatively, by feature recognition software.

Certain very specific embodiments of methods according to the invention employ bots to perform some or all of the functions of a human observer or observers, for example by sequentially evaluating performances and applying pattern-recognition software to determine, e.g., the extent of skin exposure, or satisfaction of other performance criteria such as presence of an audio stream, live video transmission, haptic data stream, etc.

The foregoing embodiments employ one or more human observers or automated means to monitor one or more performance sites featuring a plurality of human performers and add, or delete, links to their performances or links to display links to their performances, to an aggregate site depending upon their compliance or non-compliance with one or more performance criteria. In an alternative embodiment, one or more performers on a performance site or sites desire to increase the viewership potential of their performances. In particular embodiments, when a performer meets, or anticipates meeting, a performance criterion (such as removal of some or all clothing) associated with a particular aggregate site, and desires to have her performance added to an aggregate site, the performer herself provides notice to the aggregate site of her compliance with the performance criterion. In certain specific embodiments, the performer provides a signal to, or otherwise informs, the aggregate site indicating that compliance with the performance criterion is immediately imminent or currently in progress, and thus that she desires immediate addition of a display link to her performance to the aggregate site. In other specific embodiments, the performer provides notice to the aggregate site that compliance with the performance criterion will occur within a specified time interval or at one or more specified times. For example, the performer might provide notice to the aggregate site that she is one minute away from compliance with the performance criterion, at which point she desires that a display link to her performance be added to the aggregate site.

The performer can contact the aggregate site by any desired means, e.g., by activating a tab, button or other feature on an appropriate menu or other display provided by the aggregate site (or alternately a third party with which the aggregate site is affiliated) to the performer's computer via the network; or by alternative means such as personal communication with a human monitor providing aggregation links to the aggregate site as described above. For example, the performer may be provided with functionality on the performer's computer that enables the performer to click on a displayed a button icon (such as one that says "Add to Nude Now Website", which when clicked by the performer sends a signal to the aggregation site instructing one or more aggregation site computers to establish a link to the performers performance computer and to add a display link to the aggregation site such that a user viewing the aggregation site on his or her computer would be provided with the means to click on the display link to access the performance of the performer. In some preferred embodiments, the signal from the performer to be added to the aggregation site is performed by an assistant or other third-party from the assistant or other third party's computer provided with such signaling functionality or by an automated means as described above where by the meeting of the performance criterion or criteria is detected by automated means. Once the aggregate site is notified of the compliance, the aggregate site (via, e.g., a human monitor, an application maintained by the aggregate site, or other desired means) establishes an aggregation link as described above, and provides the aggregation link to the aggregate site in order to afford access to the performer's performance in an available window or via a displayed link on the aggregate site.

The foregoing embodiment employs one or more human observers to monitor one or more performance sites featuring a plurality of human performers and add, or delete, links to their performances to an aggregate site depending upon their compliance or non-compliance with one or more performance criteria. In an alternative embodiment, one or more performers on a performance site or sites desire to increase the viewership potential of their performances. In particular embodiments, when a performer meets, or anticipates meeting, a performance criterion (such as removal of some or all clothing) associated with a particular aggregate site, and desires to have her performance added to an aggregate site, the performer herself provides notice to the aggregate site of her compliance with the performance criterion. In certain specific embodiments, the performer provides a signal to, or otherwise informs, the aggregate site indicating that compliance with the performance criterion is immediately imminent or currently in progress, and thus that she desires immediate addition of her performance to the aggregate site. In other specific embodiments, the performer provides notice to the aggregate site that compliance with the performance criterion will occur within a specified time interval. For example, the performer might provide notice to the aggregate site that she is one minute away from compliance with the performance criterion, at which point she desires that her performance be added to the aggregate site.

The performer can contact the aggregate site by any desired means, e.g., by activating a tab, button or other feature on an appropriate menu or other display provided by the aggregate site (or alternately a third party with which the aggregate site is affiliated) to the performer's computer via the network; or by alternative means such as personal communication with a human monitor providing aggregation links to the aggregate site as described above. Once the aggregate site is notified of the compliance, the aggregate site (via, e.g., a human monitor, an application maintained by the aggregate site, or other desired means) establishes an aggregation link as described above, and provides the aggregation link to the aggregate site in order to afford access to the performer's performance in an available window on the aggregate site.

According to further specific embodiments, a third party, such as a managing studio with which a performer is employed or otherwise affiliated, can contact the aggregate site as described above, i.e., to advise the aggregate site that the performer will comply with the performance criterion immediately or within an indicated time. The third party can thus, in various embodiments, contact the aggregate site as described above, such as by activating an appropriate tab, button or other feature on a display provided to the third party.

In additional particular embodiments, a performer provides to the aggregate site a premium (e.g., a monetary payment or any other exchange of value) in order to modify the position of the display of her performance, or indicia of her performance such as a thumbnail, etc., on the aggregate site vis a vis other performances or link to such performances. In very particular embodiments, the greater the value of the premium provided by the performer to the aggregate site, the more favorable the position, size or other beneficial attribute of the display of her performance on the aggregate site. Such favorable positions can include, for example, positions closer to a performance window 32 in an enlarged first position (e.g., upper left) on a display on the aggregate site, or closer to a first page when the aggregate site provides multiple pages each presenting a plurality of performance windows 32. In some preferred embodiments, the performer provides a premium to the providers of the aggregation website for the purpose of displaying advertising for the performer's upcoming performance(s) that meet the performance criteria or criterion, such as, for example when he or she will next be "nude now".

According to further embodiments of the present invention, a performer provides a premium to the aggregate site in order for her performance to be placed on the aggregate site upon compliance with a performance criterion. In more specific embodiments, the performer's performance is added to a plurality of aggregate sites at which the performer desires to appear upon compliance with appropriate performance criteria associated with such aggregate sites, either upon payment of a single fee or upon payment of a fee for each separate aggregate site.

Various of the foregoing embodiments aggregate performances obtained from and originally displayed on, or accessible via link from, on one or more sites that afford access to a plurality of performances, such as MyFreeCams.com®, Live Jasmine®, etc. Performances can also be aggregated from sites maintained, operated or utilized by individual performers, such as models, actresses (e.g., "JaneDoe.com"), musicians, singers, etc. Combinations of the foregoing are also within the scope of the present invention. Thus, in some other embodiments of the invention, instead of providing a user with aggregated access to performances of performers that are "nude now" at an one or more aggregation sites, users may be provided with aggregated access to performances meeting one or more other criteria such as persons broadcasting their live travel now from their mobile cams, or persons providing live guitar lessons now, or persons providing live poker play now, etc.

The foregoing embodiments of methods according to the invention make use of observers (e.g., humans or bots or other automated means) to determine compliance with performance criteria. Alternative methods according to the present invention afford direct linkage from a performer's performance site to an aggregate site. In such embodiments, the performer himself or herself establishes an aggregation link to the link associated with her performance when she determines that the performance meets or will meet the performance criterion, and then provides the aggregation link to an aggregate site. In more specific embodiments, the performer determines that the performance meets the performance criterion or will meet the performance criterion within a specified time interval, and then establishes the aggregation link as described.

Methods according to the invention can be used to display any type of live performance for which aggregation at an aggregate site is desired, and employ any desired performance criterion or criteria. Non-limiting exemplary types of performance include dances; dramatic performances (e.g., plays, readings of prose or poetical works.); musical performances (e.g., singing, playing musical instruments); consultations by professionals, such as legal professionals (e.g., attorneys, paralegals), financial professionals (e.g., accountants, tax preparers), medical professionals (e.g., doctors, nurses), gaming performances, such as live video gaming, gambling performances, such as poker play; and the like, such performances being made by single performers or groups of two or more performers. Non-limiting exemplary performance criteria include physical characteristics (e.g., eye color, hair color, hair length, race, ethnicity, age, sex, physical measurements such as height, weight and bust size, alone or in combination); performance type (e.g., playing guitar); professional specialization (e.g., corporate law, patent law, bankruptcy law, internal medicine, pediatrics); and performance activity, such as broadcasting travel via mobile phone cam, or remote shopping or travel assistance as described, for example, in U.S. Provisional Patent Application Ser. No. 61/626,343 filed Sep. 22, 2011 and U.S. Provisional Patent Application Ser. No. 61/626,787 filed Oct. 3, 2011 (the entire disclosures of each of the foregoing patent applications and patent are incorporated by reference as if fully set forth herein).

For example, if the performer herself establishes an aggregation link to the aggregate site (i.e., self-populates the aggregation site), thus making her performance, or part thereof, visible on additional sites (such as one or more aggregate sites), she may be considered the distributor or producer of her performance as provided by 2257 Regulations with respect to the performance content make visible at such aggregate site(s). To comply with the 2257 Regulations, a producer of live performance content that is subject to the 2257 Regulations (such as live performance content containing sexually explicit depictions) must affix or associate a compliance statement as specified by the 2257 with the subject content and the producer must update the producers records which are required to be maintained pursuant to the 2257 Records to reflect the creation and distribution of the subject performance content (e.g., by addition of the URL(s) of the aggregate site at which the live subject content is displayed, a unique identifier of the performance, date of production, copy of the depiction, etc., to the records maintained by the producer of the live performances subject to the 2257 Regulations). Thus, in some preferred embodiments, when the performer self-populates the aggregation site with an aggregation link to her performance, she also triggers the functionality of an automatic § 2257 compliance system that updates a record system and provides an appropriate compliance statement that is displayed at the aggregation site(s), in accordance with the methods disclosed in the foregoing patent applications and patent.

The invention claimed is:

1. A method of aggregating displays of live performances into an aggregation site on a network, the live performances originating from at least one performance site on a network, the method comprising the steps of:
   i) establishing performance criterion upon which at least one live streaming website camera performance will be selected for aggregation onto a site on the network, ii) streaming live at least one live streaming website camera performance originating from at least one performance website on a network, the at least one live streaming website camera performance being associated with a link to access the at least one live performance on the network, iii) detecting a signal at a monitoring site in response to an indication that the at least one live streaming website camera performance meets the performance criterion where the indication is generated during and at the live streaming web site camera performance, and iv) establishing, in response to the signal, the link associated with the at least one live streaming website camera performance meeting the performance criterion into an aggregation site on a network, wherein steps (ii) and (iv) are carried out in conjunction with a processor that is operatively coupled to a memory for displaying the at least one live streaming website camera performance and for storing the link on the aggregation site on the network.

2. The method of claim 1 wherein in step i) the performance criterion is selected from the group consisting of physical characteristics, performance type, professional specialization, and performance activity.

3. The method of claim 1 includes associating an advertisement with the performance criterion.

4. The method of claim 1 wherein in step ii) the at least one live performance is selected from the group consisting of an event at least one person engaged in an activity.

5. The method of claim 1 wherein step iii) is carried out by a human observer at the monitoring site.

6. The method of claim 5 wherein step iv) is carried out by the human observer.

7. An apparatus that aggregates displays of live performances into an aggregation site on a network, the live performances originate from at least one performance site on a network, the comprising:
   i) a processor that receives input that establishes performance criterion upon which at least one live streaming website camera performance is selected for aggregation onto a site on the network, ii) transmission of a live stream of at least one live streaming website camera performance originating from at least one performance website on the network, the at least one live streaming website camera performance being associated by a processor with a link to access the at least one live performance on the network, iii) detection with the processor a signal at a monitoring site in response to an indication that the at least one live streaming website camera performance meets the performance criterion where the indication is generated during and at the live streaming website camera performance, and iv) An aggregation site on a network acts on, in response to the signal, the link associated with the at least one live streaming website camera performance meeting the performance criterion, wherein steps (ii) and (iv) are carried out in conjunction with a processor that is operatively coupled to a memory for displaying the at least one live streaming website camera performance and for storing the link on the aggregation site on the network.

8. The apparatus of claim 7 wherein in the performance criterion is selected from the group consisting of physical characteristics, performance type, professional specialization, and performance activity.

9. The apparatus of claim 7 includes an advertisement associated with the performance criterion.

10. The apparatus of claim 7 wherein the at least one live performance is selected from the group consisting of an event at least one person engaged in an activity.

11. The apparatus of claim 7 wherein detection is carried out by a human observer at the monitoring site.

12. The apparatus of claim 7 wherein aggregation is carried out by a human observer.

13. A non-transient computer readable media containing instructions that when executed, implements a method of aggregating displays of live performances into an aggregation site on a network, the live performances originating from at least one performance site on a network, the method comprising the steps of:
   i) establishing performance criterion upon which at least one live streaming website camera performance will be selected for aggregation onto a site on a network, ii) streaming live at least one live streaming website camera performance originating from at least one performance website on a network, the at least one live streaming website camera performance being associated with a link to access the at least one live performance on the network, iii) detecting a signal at a monitoring site in response to an indication that the at least one live streaming website camera performance meets the performance criterion where the indication is generated during and at the live streaming website camera performance, and iv) establishing, in response to the signal, the link associated with the at least one live streaming website camera performance meeting the performance criterion into an aggregation site on a network, wherein steps (ii) and (iv) are carried out in conjunction with a processor that is operatively coupled to a memory for displaying the at least one live streaming website camera performance and for storing the link on the aggregation site on the network.

14. The non-transient computer readable media containing instructions that when executed, implements instructions for the method of claim 13 wherein in step i) the performance criterion is selected from the group consisting of physical characteristics, performance type, professional specialization, and performance activity.

15. The non-transient computer readable media containing instructions that when executed, implements instructions for the method of claim 13 that includes associating an advertisement with the performance criterion.

16. The non-transient computer readable media containing instructions that when executed, implements instructions for the method of claim 13 wherein in step ii) the at least one live performance is selected from the group consisting of an event at least one person engaged in an activity.

17. The non-transient computer readable media containing instructions that when executed, implements instructions for the method of claim 13 wherein step iii) is carried out by a human observer at the monitoring site.

18. The non-transient computer readable media containing instructions that when executed, implements instructions for the method of claim 13 wherein step iv) is carried out by a human observer.

* * * * *